US007016876B1

(12) United States Patent
Lanier et al.

(10) Patent No.: US 7,016,876 B1
(45) Date of Patent: Mar. 21, 2006

(54) SYSTEM AND METHOD FOR UTILIZING AN EXCLUSION LIST DATABASE FOR CASINOS

(75) Inventors: Cheryl Lanier, Richmond, TX (US); Larry P. Davis, Pourtsmouth, RI (US); James P. Sullivan, Mt. Prospect, IL (US); Melanie Schmutz-Nugent, Humble, TX (US)

(73) Assignee: First Data Corporation, Hackensack, NJ (US)

( * ) Notice: Subject to any disclaimer, the term of this patent is extended or adjusted under 35 U.S.C. 154(b) by 653 days.

(21) Appl. No.: 09/473,853

(22) Filed: Dec. 29, 1999

(51) Int. Cl.
*G06F 17/60* (2006.01)
(52) U.S. Cl. ...................................................... 705/45
(58) Field of Classification Search ................... 705/45
See application file for complete search history.

(56) References Cited

U.S. PATENT DOCUMENTS

| | | | |
|---|---|---|---|
| 4,594,663 A | | 6/1986 | Nagata et al. |
| 5,256,863 A | * | 10/1993 | Ferguson et al. ............ 235/383 |
| 5,276,311 A | | 1/1994 | Hennige |
| 5,367,148 A | * | 11/1994 | Storch et al. ................ 235/375 |
| 5,534,857 A | | 7/1996 | Laing et al. |
| 5,649,118 A | | 7/1997 | Carlisle et al. |
| 5,679,938 A | * | 10/1997 | Templeton et al. .......... 235/379 |
| 5,715,314 A | | 2/1998 | Payne et al. |
| 5,748,908 A | | 5/1998 | Yu |
| 5,864,829 A | | 1/1999 | Tago |
| 6,073,121 A | * | 6/2000 | Ramzy .......................... 705/45 |
| 6,609,104 B1 | * | 8/2003 | Deaton et al. ................. 705/14 |
| 6,647,376 B1 | * | 11/2003 | Farrar et al. ................... 705/45 |
| 2003/0050892 A1 | * | 3/2003 | Clynes et al. ................. 705/45 |

FOREIGN PATENT DOCUMENTS

JP    02002336512 A  *  12/2002

OTHER PUBLICATIONS

Illinois Gaming Board Regulations, Title 86, Part 3000, Sections 700, 710, 720, 725, 730, 740, effective no later than Apr. 1, 1997.*
Two documents showing persons excluded from gaming in New Jersey for passing bad checks.*
Title 5, Section 5:12-1, New Jersey Permanent Statutes, 1977.*
Chapter 39, New Jersey State statutes regarding self-exclusion of persons from gaming.*

* cited by examiner

*Primary Examiner*—Charles R. Kyle
(74) *Attorney, Agent, or Firm*—Brooks Kushman P.C.

(57) ABSTRACT

The invention relates to a system and method of providing casinos an electronic means of accessing a database identifying individuals listed on a gambler's exclusion list created by a state's gaming commission. The invention provides a particularly efficient way for a casino to avoid incurring penalties by inadvertently cashing checks belonging to individuals on an exclusion or disassociated persons list. The invention allows the casino teller to run a check transaction while simultaneously determining if the individual is listed as a compulsive gambler by the state's gaming commission. The invention achieves these objectives by providing a host computer, a database residing with the host computer, a means for inputting data from a plurality of sources, and a microprocessor residing at the host computer. The database stores identification information and other inputted data about individuals, the database includes a status listing of disassociated check writers. The means for inputting data is in communication with the host computer. The microprocessor compares inputted data to the database and generates a response as a result of the comparison.

2 Claims, 1 Drawing Sheet

SYSTEM AND METHOD FOR UTILIZING AN EXCLUSION LIST DATABASE FOR CASINOS

TECHNICAL FIELD

The present invention relates to a system and method for identifying a check writer listed on a Disassociated Person or Exclusion List from a database containing such information.

BACKGROUND ART

Compulsive gambling is a major and devastating problem with severe economic consequences. With the proliferation of gambling establishments in recent years, there has been dramatic escalation in legislation in this area. A number of groups have expressed concern about compulsive gamblers, and the economic consequences that follow from compulsive gaming. As a result, this is an area that has become a target of concern for state legislatures.

Many states are looking at instituting legislation that prohibits a person, who voluntarily places himself or herself on a state supported and maintained disassociated person or exclusion list, from entering the premises of any gambling establishment in that state. Currently, in the state of Missouri, individuals may voluntarily place themselves on a gambler's exclusion list. They do this by providing the state gaming commission with personal information when they fill out a Disassociated Persons Questionnaire.

Typically this information may include, but is not limited to: the individual's name, address, Driver's License (state and number), Social Security Number (SSN), and could also include personal information such as a recent photo of the individual. The applicant is required to sign a Waiver of Liability as well as an Authorization and Request to Release Information form. After a careful screening process, to determine the applicant has made a sound decision by placing their name on the list, the state will add the applicant name to the list. Once the information is reviewed and processed by an agent of the Missouri Gaming Commission, the individual is informed that his or her name has been placed on the gambler's exclusion list and he or she will be held liable for criminal trespass, if found in a gaming establishment. A copy of the exclusion list is circulated on a regular basis to casinos. Failure of casinos to identify and exclude individuals on the exclusion list can result in fines and or the closure of the establishment. In Missouri, there is legislation enforcing the exclusion of individuals who are listed on the state's exclusion list. A number of other states are expected to follow with similar enforcement provisions in the near future.

In a busy casino, a typical night involves a high volume of transactions of which check cashing represents a significant means whereby patrons gain access to cash. In this situation, the casino strives to be efficient by completing transactions without undue delay or unnecessary embarrassment to the individual cashing the check. In the fast changing sea of faces often present in casinos, neither the tellers nor their supervisors typically develop personal relationships with the gaming patrons. Consequently, there is a need to develop a system of quickly and efficiently ascertaining whether the individual presenting a check for cashing has or has not been listed on the gambler's exclusion list put out by the state gaming commission. At present there is only one process available to the casino that allows them the ability to review and compare each customers personal information against the information provided by the state gaming commission and this would be a manual identification at the point when a check is presented for cash at the cage.

Casinos are required to perform due diligence necessary to ensure that every person presenting a check for cashing is not on the state's disassociated list. This is typically accomplished by manually reviewing the information on the list, provided by the state, with the same information presented by the check writer, i.e., if the list requires a Social Security Number (SSN), then the casino will also require a SSN for comparison on the list. If there is a match or hit between the individual presenting a check for cashing and one listed on the Exclusion list, security will be summoned for further inspection of the check writer and the information supplied by the gaming commission. If after a visual inspection, it is determined that the check writer is listed on the Exclusion List, the casino must notify the police who then must file criminal trespass charges against the check writer.

Current concerns for the casinos would be the check writer's time spent waiting in line (while their information is reviewed and compared against the list), the accuracy and thoroughness of the teller taking the check and comparing it to the list, the possibility of rejecting a check writer in error, and the possibility of facing fines and/or penalties from taking a check from a person on the list. Penalties are imposed on the casino if a person on the list is found anywhere on the premises. These penalties are determined at the discretion of the state gaming commission and could ultimately lead to closure of the establishment.

DISCLOSURE OF INVENTION

The present invention discloses a system and method by which a check writer listed on an exclusion or disassociated person list ("a disassociated check writer") may be identified from a database housing exclusion list information in order to determine if the check writer is on the list before further determining if the check will be honored by the host institution.

One object of the invention is to ensure that individuals who are listed as disassociated check writers by the gaming commission are identified, prevented from cashing checks at the casino and removed from the premises as required by law. The invention accomplishes this by having a process of identifying the customer by automatically referencing the individual's social security number and date of birth or reading the customer's unique check identification number (ID); processing the request by using the customer identification number to access the customer's record if any; returning an appropriate customer request response; and updating the customer database in a host computer to reflect new information supplied from one such as a government body responsible for compiling such a list. The exclusion list references only the individual's social security number and date of birth. The exclusion list may not be accessed by the casino teller prior to check cashing upon presentation of the check.

Another object of the present invention is to safeguard casinos who inadvertently cash checks from individuals listed on the gamblers' exclusion list by the state's gaming commission. Currently, in the state of Missouri, casinos are fined up to $25,000 per violation when casinos cash checks belonging to individuals listed on the state's gambler's exclusion list provided to casinos by the Missouri Gaming Commission. The exclusion list is published and circulated to casinos on a regular basis. This invention is intended to provide a tool to flag disassociated check writers.

Yet another object of the invention is to provide a rapid and efficient system and method for check cashing. If individual tellers were forced to follow multiple steps in order to ascertain whether or not an individual was listed on the state's gambler's exclusion list, a great deal of time would be expended and there would be the risk that the teller may forego ascertaining whether the individual was listed as a compulsive gambler or not, in the interests of saving time. Time, better suited to serving other customers or, from the casino's perspective, better spent by the customer at the gaming tables.

Another objective of the invention is to assist the casinos by reducing their potential exposure of receiving penalties due to unknowingly allowing persons on the list access to the premises.

Other objects, features and advantages of this invention will become apparent from the drawings and the following detailed description of the preferred embodiment, and the appended claims.

BRIEF DESCRIPTION OF DRAWINGS

The accompanying drawings illustrate features of the invention in which like numerals represent like elements and in which.

BEST MODE FOR CARRYING OUT THE INVENTION

The check transaction processing system and method of the present invention enables a casino teller presented with a check with the ability to quickly and accurately verify the checking information at the entity housing an exclusion list database, and then to determine, through the exclusion list database, if the check writer is on the disassociated person or exclusion list.

Figure 1:
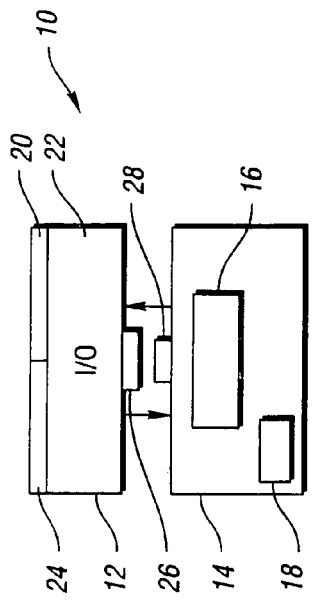
FIG. 1 is a schematic view of the overall system in accordance with one embodiment of the present invention.

FIG. 1 schematically illustrates a system 10 for identifying disassociated check writers whose status as disassociated check writers is housed in a database. System 10 includes an input/output device (I/O) 12, and a host computer 14 in communication with device 12 which could be a point of sale (POS) device, a personal computer (PC) or similar device to transmit check writer data. As shown host computer 14 includes a microprocessor 16 and database 18 in communication with microprocessor 16.

I/O device 12 is the mechanism by which check writer information may be inputted and stored for use in system 10. The I/O device may be of any type capable of sensing magnetic ink from checks. The I/O device may include a magnetic swipe slot through which a check may be swiped. Additionally, the I/O device may have a display screen 20, keypad 22 and a slip printer 24. Moreover device 12 may be connected via modem 26 which transmits check writer information to host computer 14. I/O device may be disposed at teller cages located within the casino premises.

Host computer 14 includes microprocessor 16 and database 18. Database 18 has information on the disassociated check writers. Database 18 could be any type of medium suitable for the storage of this type of information. For example, database 18 could be a disk drive and a control or a plurality of disk drives and controls. The disassociated list information could be provided to the entity housing the exclusion list database by the state gaming commission or from the casinos directly. This information can be supplied in various forms including electronic or hard copy (paper) format. The information will be entered into an exclusion data base upon receipt. Upon entry into the database, the exclusion list can be readily accessed by casinos subscribing to the service that allows them access to the exclusion list database. Typical information provided by the gaming commission would include (but would not be limited to) the check writer's name, Driver's License number, social security number (SSN) and Magnetic Ink Character Recognition (MICR) information. The Exclusion List database will also accommodate future technological enhancements such a biometrics (retinal or thumbprint scan).

Microprocessor 16 may be any suitable processor which is capable of capturing the information on individual check writers and later retrieving such information to identify a match between the information input at the I/O device and the information stored within the database 18. For example, microprocessor 16 may be a processor having the trade name AXT™ manufactured by Digital Equipment Corporation and having a speed of 600–650 megahertz and any suitable amount of memory. It should be noted that a plurality of microprocessors may be used.

The check writer's information provided to the entity compiling the exclusion list database may be accessed through the use of proprietary equipment belonging to that entity, but it should be noted it is not limited to that particular entity's point of sale equipment. Access could also be gained by use of a MICR reader integrated with a personal computer system or any other means whereby the MICR numbers can be read electronically.

The means through which device 12 and host computer 14 are in communication may be any telecommunication network. As stated above, device 12 has a modem which may be used to communicate with host computer 14. Likewise, host computer 14 may also have a modem 28 to transmit and receive information.

It should be noted that system 10 shown in FIG. 1 is merely one example of a system of the present invention. Other systems used do not fall beyond the scope and spirit of this invention.

Figure 2:
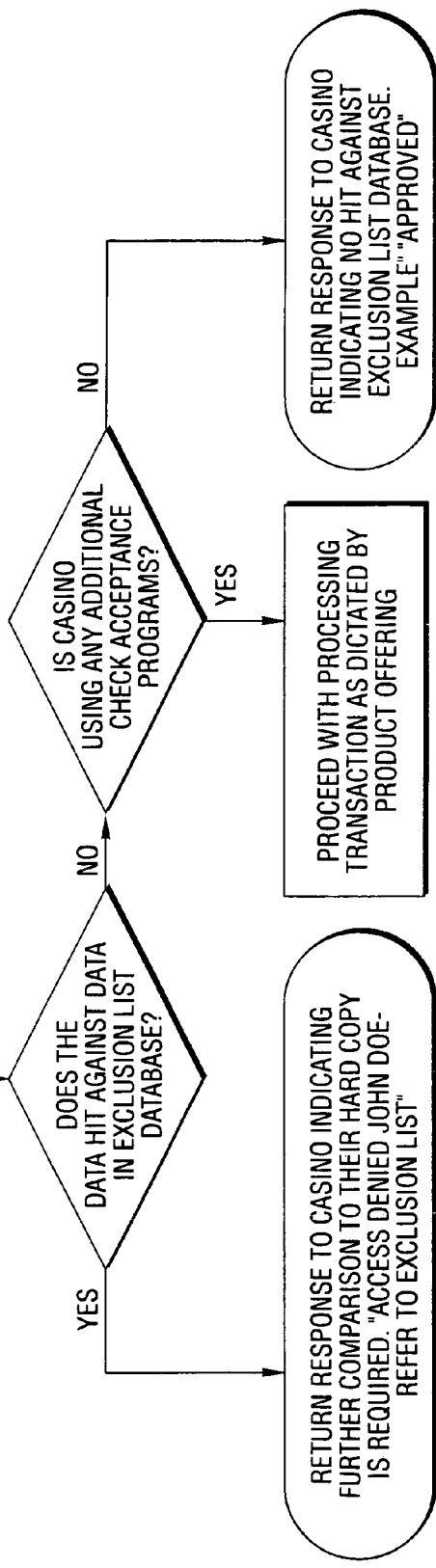
FIG. 2 is a flow chart illustrating the method of identifying individuals listed on the exclusion list from a database provided by the present invention.

FIG. 2 illustrates an example of the method of the present invention in accordance with system 10 of FIG. 1. Access to the Exclusion List database, will be initiated when authorization for check cashing transaction is sought at a point of sale device 12 which may be a Personal Computer (PC) linked to the host computer 14 in which is stored the exclusion list database 18. At the moment an individual attempts to cash a check, the check may for example, be read electronically at a point of sale device 12, and key information is entered when prompted from the system. The information entered could include the Driver's License, the MICR number, the social security number and other biometric information if the system is so configured as to require biometric information. The data entered will be transmitted by device 12 to host computer 14 by way of, for example telephone networks. Microprocessor 16 receives the check writer information and compares the information received from I/O device 12 to the exclusion list database 18 information stored in host computer 14 to determine if there is a hit, or match, with the information entered. If there is match, a response will be transmitted to the casino indicating there was a match via, for example local telephone networks. This response may include additional information about the check writer that could assist the teller to identify them. For example, a response indicating "Access Denied to John Doe-Exclusion List" would be sent to the display screen. In the event there is no match between the data entered and the exclusion list data stored at the entity housing the exclusion list database, the teller would be instructed to proceed with the transaction as routinely performed. A transaction summary would be made available to the patron from slip printer 24.

While embodiments of the invention have been illustrated and described, it is not intended that thee embodiments illustrate and describe all possible forms of the invention. The words used in the specification are words of description rather than limitation, and it is understood that various changes may be made without departing from the spirit and scope of the invention.

What is claimed is:

1. A method for cashing a check presented by an individual at a gambling establishment, the method comprising:
   providing a host computer containing an exclusion list database, wherein the exclusion list database stores a list of individuals to be excluded from the gambling establishment and checking account magnetic ink character recognition (MICR) numbers respectively associated with the individuals of the list of individuals;
   receiving at a point of sale device of the gambling establishment a check presented by an individual for cashing;
   scanning at the point of sale device of the gambling establishment checking account MICR information of the check presented by the individual;
   identifying a checking account MICR number associated with the individual presenting the check based on the scanned checking account MICR information of the presented check;
   transmitting from the point of sale device the identified checking account MICR number associated with the individual presenting the check to the host computer;
   comparing the identified checking account MICR number associated with the individual presenting the check with the checking account MICR numbers stored in the exclusion list database to determine whether the individual presenting the check is an individual to be excluded from the gambling establishment, wherein the individual presenting the check is determined to be an individual to be excluded from the gambling establishment if the identified checking account MICR number associated with the individual presenting the check matches a checking account MICR number stored in the exclusion list database;
   preventing the presented check from being cashed at the point of sale device of the gambling establishment if it is determined that the individual presenting the check is an individual to be excluded from the gambling establishment; and
   cashing the presented check at the point of sale device of the gambling establishment if it is determined that the individual presenting the check is not an individual to be excluded from the gambling establishment.

2. The method of claim 1 wherein cashing the presented check includes using an additional check acceptance program.

* * * * *